UNITED STATES PATENT OFFICE.

JACKSON RICHARDS, OF PHILADELPHIA, PENNSYLVANIA, ASSIGNOR TO THE UNITED STATES BOILER CLEANING COMPOUND COMPANY, OF SAME PLACE.

BOILER-CLEANING COMPOUND.

SPECIFICATION forming part of Letters Patent No. 683,330, dated September 24, 1901.

Application filed February 25, 1901. Serial No. 48,828. (No specimens.)

*To all whom it may concern:*

Be it known that I, JACKSON RICHARDS, a citizen of the United States, residing at Philadelphia, in the county of Philadelphia and State of Pennsylvania, have invented new and useful Improvements in Boiler-Cleaning Compounds, of which the following is a specification.

My invention relates to a boiler-cleaning compound; and the objects of the same are to provide a compound which will readily dissolve in hot or cold water and which may be injected into a boiler for removing scale and preventing the formation of scale in new boilers.

The composition consists of the following ingredients: ground extract of logwood, ground potato starch, ground borax, (refined.) These ingredients are mixed together by the ordinary process of trituration in accordance with the quantity desired for a boiler of certain dimensions. The proportions which I desire to use are substantially as follows: ground extract of logwood, eighty parts; ground potato starch, ten parts; ground borax, (refined,) ten parts.

To use this compound, a quantity is dissolved in hot or cold water, using, say, fifteen pounds of the compound to clean a one-hundred horse-power boiler. The compound is injected into the boiler through the injector and allowed to remain for a period of ten days, occasionally drawing off the boiler about one-half at the expiration of the ten days and then renewing the operation as before at stated intervals.

I am aware that each of the above ingredients has been used for cleaning boilers, but I am not aware that the combination of all three has ever been employed.

Having thus described my invention, what I claim is—

A compound for cleaning boilers, consisting of ground extract of logwood, ground potato starch and ground borax, in the proportions substantially as described.

In testimony whereof I have hereunto set my hand in presence of two subscribing witnesses.

JACKSON RICHARDS.

Witnesses:
WINFIELD S. WALKER,
FREDERICK H. VOLLMER.